(12) United States Patent
Cheng et al.

(10) Patent No.: US 12,399,038 B2
(45) Date of Patent: Aug. 26, 2025

(54) METHOD AND SYSTEM FOR DETERMINING A PHASE SHIFT BETWEEN COMPONENTS OF VARIABLY AMPLIFIED LIGHT

(71) Applicant: Nederlandse Organisatie voor toegepast-natuurwetenschappelijk onderzoek TNO, 's-Gravenhage (NL)

(72) Inventors: Lun Kai Cheng, Krimpen aan den IJssel (NL); Edward Jacobus Johannes Doppenberg, Zandvoort (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 39 days.

(21) Appl. No.: 18/284,505

(22) PCT Filed: Mar. 31, 2022

(86) PCT No.: PCT/NL2022/050179
§ 371 (c)(1),
(2) Date: Sep. 27, 2023

(87) PCT Pub. No.: WO2022/211630
PCT Pub. Date: Oct. 6, 2022

(65) Prior Publication Data
US 2024/0175725 A1    May 30, 2024

(30) Foreign Application Priority Data
Mar. 31, 2021 (EP) ..................... 21166423

(51) Int. Cl.
*G01D 5/353* (2006.01)
*G01H 9/00* (2006.01)

(52) U.S. Cl.
CPC ..... *G01D 5/35306* (2013.01); *G01D 5/35361* (2013.01); *G01H 9/004* (2013.01)

(58) Field of Classification Search
CPC . G01D 5/35306; G01D 5/35361; G01H 9/004
See application file for complete search history.

(56) References Cited

U.S. PATENT DOCUMENTS

2005/0275846 A1* 12/2005 Cheng ................ G01B 9/02067
356/450
2017/0350735 A1* 12/2017 Cheng ................ G01D 5/35329
(Continued)

FOREIGN PATENT DOCUMENTS

AU    2015201357 B2    4/2015
EP    3477266 A1    5/2019
(Continued)

OTHER PUBLICATIONS

European Patent Office, International Search Report in corresponding International Application No. PCT/NL2022/050179, dated Jun. 8, 2022 (2 pages).
(Continued)

*Primary Examiner* — Hina F Ayub
*Assistant Examiner* — Kaitlyn E Kidwell
(74) *Attorney, Agent, or Firm* — Leydig, Voit & Mayer, Ltd.

(57) ABSTRACT

An interferometer suitable for Distributed Acoustic Sensing (DAS) is has two interferometer arms of different length, from which light is fed to an N-way optical coupler (N at least 2). In DAS, the light is backscattered light received from within an optical fiber. Incoming light is amplified by an adjustable factor, which may vary as a function of time in DAS. The N way optical coupler supplies combinations of light from the arms with different relative phase offsets to each other to N outputs. Phase shift between interfering
(Continued)

components is computed from the light intensities detected by detectors at the N outputs. Correction of the computed phase shift is applied dependent on the value of the adjustable amplification factor. For this, one interferometer arm comprises a phase modulator, which is used obtaining measured detector output signals from the detectors with different phase shifts by the phase modulator when the value of the adjustable factor is used. Data is determined that defines average of output signals of the different detectors under variation of different phase shift by the phase modulator based on the measured signals. For DAS, data defining time dependent averages according the variation of the factor are determined. A phase shift between interfering light is computed with a correction to compensate for differences between the average detector output signals for the individual optical detectors.

13 Claims, 3 Drawing Sheets

(56) References Cited

U.S. PATENT DOCUMENTS

2018/0299256 A1* 10/2018 Cheng ................ G01B 11/0675
2024/0012760 A1* 1/2024 Farhadiroushan .. G06F 12/0246

FOREIGN PATENT DOCUMENTS

EP          3237846 B1   12/2019
WO    WO 2015/030822 A1    3/2015

OTHER PUBLICATIONS

European Patent Office, Examination Report in corresponding European Patent Application No. 22715405.1 dated May 28, 2025.

* cited by examiner

METHOD AND SYSTEM FOR DETERMINING A PHASE SHIFT BETWEEN COMPONENTS OF VARIABLY AMPLIFIED LIGHT

CROSS-REFERENCE TO RELATED APPLICATIONS

This patent application is a U.S. National Phase of PCT International Application No. PCT/NL2022/050179, filed Mar. 31, 2022, which claims priority to European Application No. 21166423.0, filed Mar. 31, 2021, which are both expressly incorporated by reference in their entireties, including any references contained therein.

FIELD OF THE INVENTION

The invention relates to a system and method for performing interferometry, with an application to Distributed Acoustic Sensing (DAS).

BACKGROUND

In optical DAS measurements local length changes of an optical fiber are used to detect the effect of external influences on the fiber. The local length changes are detected from changes in the optical phase of backscatter (e.g. Rayleigh backscattering) received at the input of the optical fiber from a region along the fiber. In particular, the phase difference between backscatter from different regions can be measured with high phase sensitivity from optical interferometric measurements.

To obtain such measurements, a pulse of light with is transmitted through the fiber from an input of the fiber. The pulse causes backscattered return light at the input. The backscattered light is passed through different arms of an optical interferometer that have different optical lengths. At a given time delay after transmission of the pulse, this results in interference between backscatter from a pair of different regions in the optical fiber, from which the travel time back and forth through the fiber and through the respective arms require that given time delay. From the interference a phase shift between the received scattered light from the regions can be determined. Differences between the phase shifts measured for the same given time delay from responses to pulses sent at different times indicate optical length changes of the fiber between the regions.

For such measurements, a number of problems need to be addressed. To facilitate comparison, sensitive and reproducible phase shift measurements are needed that do not depend strongly on variable circumstances other than local length changes. Furthermore, the phase shift measurements need to be robust against intensity variation as a random function of position within the fiber, such as arise in the scattering process. Another problem is that the random variation of the backscatter intensity can make the backscatter intensity, which is already small on average, so small as to become undetectable from some positions along the fiber.

The latter can be addressed by applying variable optical amplification to the backscattered light so as to counteract intensity variation as a function of backscatter position in the optical fiber (i.e. as a function of time from pulse transmission), before detection of the phase difference. As used herein, variable optical "amplification" may include variable intensity attenuation as well as variable intensity enhancement.

Furthermore, it is known to perform sensitive and reproducible phase shift measurements that do not depend on intensity variation of the interfering light by 3-way interferometry. 3-way interferometry involves creating at least three combinations of light from the different arms of the interferometer, the combinations comprising mixes of predetermined intensity fractions of light from the different arms with predetermined different phase offsets (preferably equal intensity fractions of 120 degrees phase offsets). In 3-way interferometry the phase shift is computed from the intensities of such combinations.

Since 3 signals are available, and if the phase can be computed independent of the amplitudes of the intensities of the light from the different arms of the interferometer. When the intensity fractions are equal and the phase offsets are 120 degrees the expression for the phase difference "phi" between the light from the different arms is $$tg(phi)=sqrt(3)*(W(3)-W(2))/(2*W(1)-W(2)-W(3))$$

Herein $W(i)$ with $i=1, 2, 3$ are the measured intensities of the different combinations, with the combinations $i=2, 3$ providing for phase offsets of plus and minus 120 degrees relative to the phase offset for the combination with $i=1$. If the predetermined fractions are not equal and/or the predetermined phase offsets are not 120 degrees, a similar but corrected expression may be used.

As noted, the availability of 3 measured intensities $W(i)$ makes it possible to compute $tg(phi)$ independent of the intensities of the light from the interferometer arms. As can easily be seen from the expression for $tg(phi)$, the value of $tg(phi)$ according to this expression does not change if the same value is added to all $W(i)$, as may be caused by background light, or all $W(i)$ are multiplied by a common factor, as when the intensities of the light from the interferometer arms are amplified by a common factor. Hence it may be expected that the variable optical amplification to the backscattered light as a function of time from pulse transmission does not affect the phase measurement.

However, it has been found that in practice the variable optical amplification resulted in significant errors in the outcome of the 3-way interferometer phase difference outcome even though the amplification was applied to both interfering components, so that it does not affect their actual phase difference.

EP3477266 discloses a DAS system with a coherent light source, an optical modulator and an optical amplifier in series to feed amplified, modulated coherent outgoing light into an optical sensing fiber. A control device controls the modulation by the modulator and amplification by the optical amplifier to compose a desired interrogating light pattern of the outgoing light. Coherent interrogating light patterns are repeatedly sent into an optical sensing fiber A detector device receives backscattering of the light from the sensing fiber and converts the backscattered light into an electrical signal. The control device also controls operation of the detector device including switching off and on, a gain factor and a dead time. A subsequent processing chain is used to average a signal or signals over time e.g. to reduce noise or to perform low pass filtering of the signal(s) to reduce noise.

SUMMARY

Among others, it is an object to provide an optical interferometer system that makes it possible to correct for errors in the determination of phase difference values.

Among others, it is an object to improve the accuracy of the phase shift measurements of scattered light in an optical DAS system and method.

A method for determining a phase shift between components of incoming light is provided, e.g. for use in an optical DAS system, using an interferometer system that comprises
a first interferometer arm and a second interferometer arm, an optical length of the second interferometer arm differing from an optical length of the first interferometer arm;
N optical detectors, where N is greater than one, each optical detector having an optical input;
an N-way optical coupler, configured to supply combinations of light from the first interferometer arm and the second interferometer arm with different relative phase offsets to each other to the optical inputs of the N optical detectors respectively;
a phase modulator coupled in series with the first interferometer arm; the method comprising
optically amplifying the incoming light by an adjustable amplification factor;
obtaining, for each of the optical detectors, measured detector output signals obtained with different phase shifts by the phase modulator when a value of the adjustable amplification factor is used,
determining, for each of the optical detectors, from the measured detector output signals, data that defines an average of output signals of the optical detector obtained with the different phase shifts;
computing a phase shift between light from the first interferometer arm and the second interferometer arm from detector output signals from the optical detectors obtained with said value of the adjustable amplification factor, with a correction to compensate for differences between the defined average detector output signals for the optical detectors.

It has been found that the unexpected errors in the computed phase difference outcome of the 3-way interferometer in the case of variable optical amplification can be prevented by using, for each detector output signal, an amplification dependent correction specific to the detector that produces the detector output signal. The correction at an amplification setting may be based on data that defines an average value of output signals of the optical detector obtainable by means of phase shift at the position of the phase modulator in the first arm, e.g. an average over all phase shifts over a three hundred a sixty degree range. The average values may be defined by actually determining its value, but defining average values is not limited to actual determination of the average value. For example, data that defines the average value may be determined by determining a maximum and minimum of the detector output signal obtained as a result of modulation by the phase modulator, the average being defined by the average of the maximum and minimum value. As another example, the detector output signal may be used to determine the average from parameters of an expression that defines signal changes as a function of phase shift angle (e.g. as the average plus a factor times a cosine of the phase shift angle). Even a set of obtained measured values may be used as data that defines the average values as a sum of these measured values divided by the number of measured values, without actually calculating the average.

The correction may be applied for example by subtracting the defined average values form the detector output signals before computing the phase difference from the detector output signals. Alternatively, the correction may be applied elsewhere in the computation, using the data that defines the averages. It may not be necessary to compute the defined average value explicitly for applying the correction. The correction may be applied as part of an expression for the phase difference in terms of the detector output signal values using the average value and/or maximum and minimum values whose average is the average value as parameters in the computation and/or using obtained measured values in a way that makes the correction correspond to the result of using the average.

One of the detector output signals from which the value that defines the average may also be used to compute the phase shift. But preferably, the average is used for a plurality of measurements with the same optical amplification settings, which need not include any of the detector output signals from which the value that defines the average is determined.

In DAS measurements, the optical amplification may be used to reduce the optical intensity variation of the backscatter before detection. Although the phase modulator may be too slow to apply phase shift in a DAS system at the speed at which the phase of the backscattered light fluctuates, and/or at the speed at which the optical amplification varies, it is possible to improve the accuracy of the phase shift measurements for DAS as well. Time dependent data defining the average for each of the optical detectors, as a function of time from the light pulse may be determined. Dependence on time from the light pulse, i.e. the time delay between a time point of transmission of the pulse and the time point of detection, corresponds to dependence on backscatter position along the optical fiber.

In an embodiment, the phase shift may be computed with a further correction to equalize effects of signal scale differences of detector output signals from different ones of the detectors according to the difference between the maximum and minimum detector output signals for the detectors.

Preferably, a three way interferometer is used, i.e. an interferometer with an optical combiner (also referred to herein as a "coupler") that combines light from the interferometer arms in at least three different relative phase combinations and detect the intensity of each combinations. But alternatively, other numbers, N, of combinations may be used, such as N=2.

BRIEF DESCRIPTION OF THE DRAWING

These and other objects and advantageous aspects will become apparent from a detailed description of exemplary embodiments with reference to the following figures.

DETAILED DESCRIPTION OF EXEMPLARY EMBODIMENTS

Figure 1:
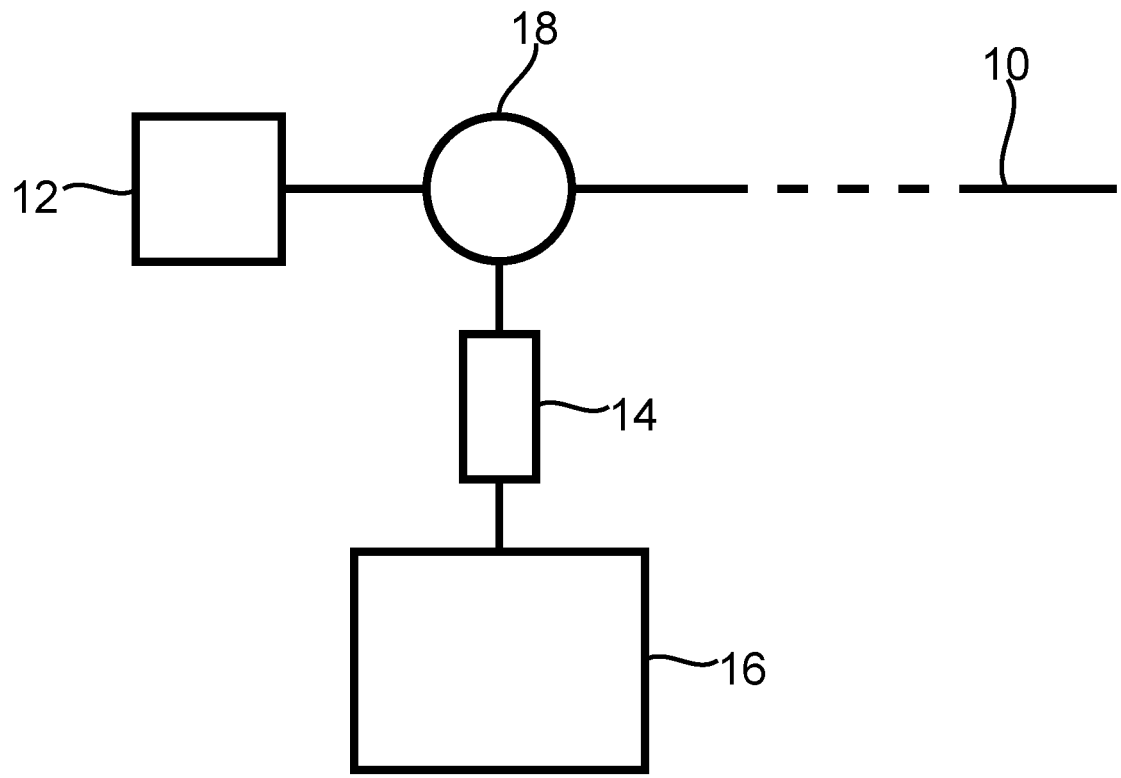
FIG. 1 shows an optical an optical DAS system
FIGS. 2 and 3a,b show an optical interferometer system

FIG. 1 shows an optical DAS system comprising an optical fiber 10, a pulsed light source 12, an optical amplifier 14, an optical interferometer system 16 and a circulator 18 coupling pulsed light source 12 to optical fiber 10 and optical fiber 10 to optical interferometer system 16 via optical amplifier 14. Optical fiber 10 may run over a structure under test, such as a road bridge, for monitoring structural changes. In other embodiments optical fiber 10 may run underground along a fiber path, for detecting the effect of forces on the ground along the fiber path.

In operation, pulsed light source 12 generates a sequence of optical pulses, and circulator 12 supplies these pulses to an input of optical fiber 10. The pulses travel along optical fiber 10, creating back-scattered light from a continuous range of positions along optical fiber 10. Circulator 12 supplies the back-scattered light that has arrived back from the input of optical fiber 14 to optical interferometer system 16 via optical amplifier 14. Optical interferometer system 16 uses the backscattered light to detect changes in the phase difference between backscattered light from pairs of back-scatter positions. Preferably, light in both arms is first amplified by the same amplifier, but alternatively each arm may have its own amplifier, e.g. with both having the same amplification factor. As used herein the amplification factor may be larger and/or smaller than one.

Figure 2:
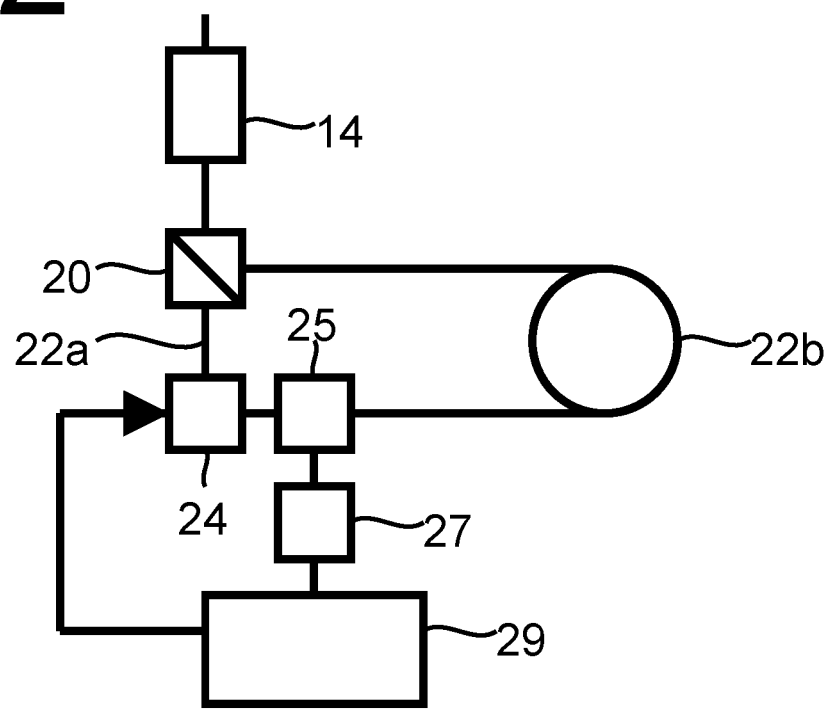
Figure 3A:
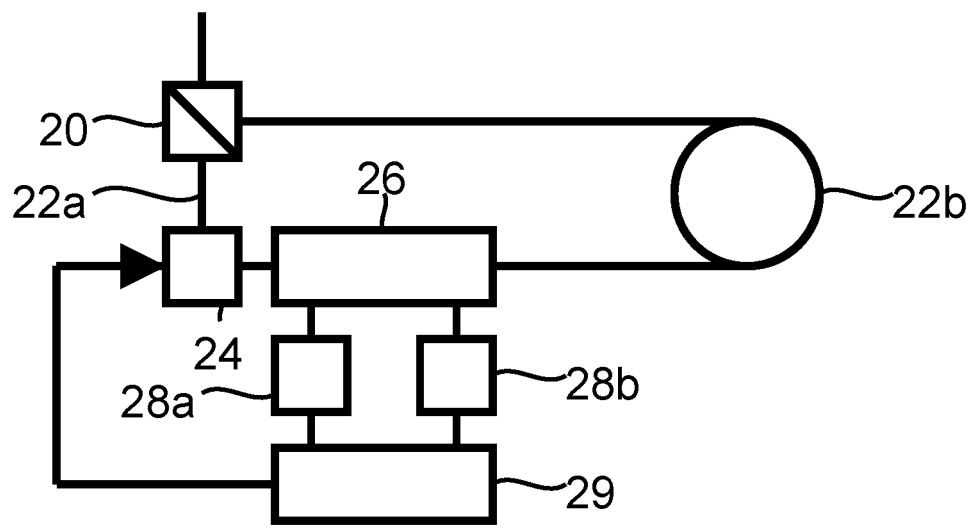

FIGS. 2 and 3a,b show alternative embodiments of the optical interferometer system. The optical interferometer systems splits amplified backscattered light into parts and feeds the split parts through interferometer arms of different optical length. The optical interferometer system detects light intensity of a combination of light from the interferometer arms as a function of time after transmission of a light pulse from light source 12. This results in coherent interference between backscatter from positions in optical fiber 10 that are separated by optical path lengths in a coherence length dependent optical path length range. The optical path length range includes half the difference between the path lengths of the interferometer arms, plus and minus half the light pulse length in the fiber. As is known from the DAS prior art the coherence length of light in the pulses may intentionally be limited.

The positions that results in coherent interference are increasingly further away from the input of optical fiber, with increasing delay time after the transmission of the light pulse from light source 12. The pulses are spaced with a time spacing that preferably is larger than the time needed for light to travel back and forth between the ends of optical fiber 10. The optical interferometer system is configured to detect the relative phase difference between the interfering parts as a function of time after the transmission of the light pulse from light source 12 and hence as a function of location in the DAS fiber.

FIG. 2 shows an optical interferometer system comprising an optical splitter 20, a first arm 22a and a second arm 22b with inputs coupled to outputs of splitter 20, an optical combiner 25 with inputs coupled to outputs of first arm 22a and second arm 22b respectively, a light detector 27 coupled to an output of optical combiner 25 and a processing system 29 with an input coupled to an output of detector 27. The optical amplifier 14 may be part of the optical interferometer system, first and second arm 22a,b passing parts of the amplified light from optical amplifier 14. Instead optical amplifiers may be provided first and second arm 22a,b.

A phase modulator 24 is coupled in series with first arm 22a between optical splitter 20 and optical combiner 25, with second arm 22b in parallel with the series of phase modulator 24 and first arm 22a. Processing system 29 has an output coupled to a control input of phase modulator 24. Processing system 29 may comprise one or more programmable computers, such as a digital signal processor, and a storage device that stores a program for execution by the one or more programmable computers. As used herein, such a processing system 29 will be said to be configured to perform described steps when the program comprises instructions for performing these steps. Alternatively, processing system 29 may comprise dedicated electronic circuits to perform part or all of such steps.

The optical DAS system of FIG. 1 is described as containing the optical interferometer system of FIG. 2, but the optical DAS system may also be seen as an optical interferometer system according to FIG. 2 with additional components, such as light source 12 etc.

In principle, processing system 29 could be configured to cause phase modulator 24 to change a phase shift imparted by phase modulator 24 to determine a control signal for which the output signal of detector 27 reaches a minimal value smaller than for any other phase shift. Thus, the determined value of the control signal represents a phase difference between the interfering optical signals.

If applied to DAS measurements this would require comparing measurements obtained with a large number of pulses, using different control signals. Thus, variations between the circumstances during different pulses can affect the determination of the phase shift. Moreover, a broad minimum may arise and as a result the represented phase difference becomes less accurate and the accuracy of the phase value depends on the accuracy of phase control by phase modulator 24.

According to another principle, processing system 29 may be configured to cause phase modulator 24 to vary a phase shift imparted by phase modulator 24 to determine a value that corresponds to an average of the output signal of detector 27 for each location in the DAS fiber. Thus, the determined value of the control signal represents a phase value at which the interfering light components are ninety degrees out of phase. This avoids the need to determine the phase shift from a broad minimum, but variations between the circumstances during different pulses (e.g. the Rayleigh scattering amplitude, the visibility of the interference, the amplification of the amplifier, etc.) can still affect the determination of the phase shift and the accuracy of the phase value depends on the accuracy of phase control by phase modulator 24.

FIG. 3a shows an optical interferometer system similar to that of FIG. 2, except that optical combiner 25 has been replaced by a two-way combiner 26 with inputs coupled to first arm 22a and second arm 22b respectively and two outputs. More generally, instead of two-way combiner 26, an N-way combiner (N>1) may be used. An N-way combiner combines light from a first and second input with N different relative phase offset.

Figure 3B:
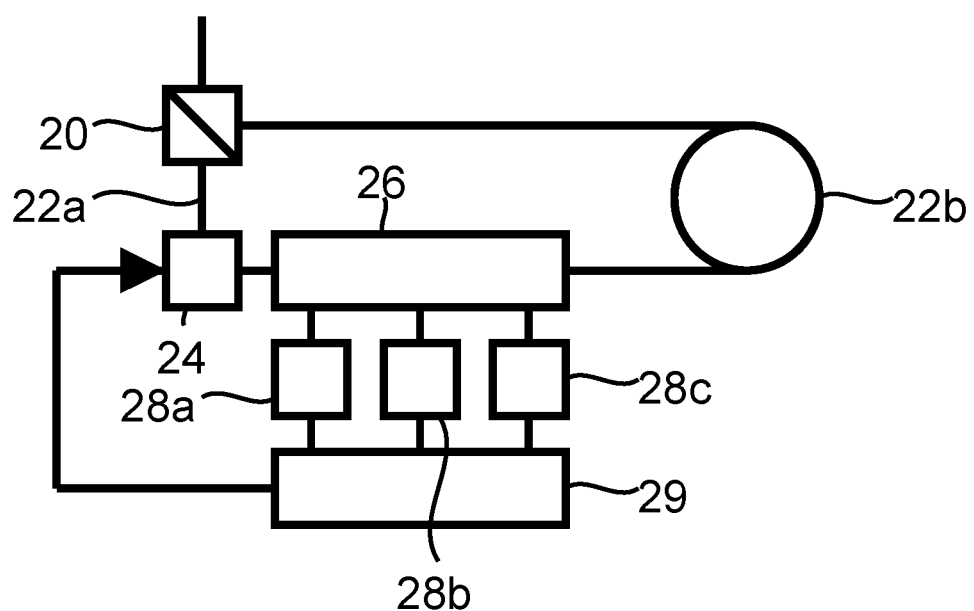

FIG. 3b shows an embodiment with an N=3-way combiner. Preferably, the phase offsets are equally spaced over a three hundred and sixty degrees interval or over a hundred and eighty degrees interval. Thus, the phase offsets of an N=2-way combiner are preferably spaced by a hundred and eighty or ninety degrees, and the phase offsets of an N=3-way combiner are preferably spaced by a hundred and twenty or sixty degrees. Compared to FIG. 2, detector 27 has been replaced in FIGS. 3a, b by a plurality of N light detectors 28a-b, 28a-c coupled to different outputs of N way combiner 26 respectively.

An interferometer with 3 a three way combiner is known per se. Such an interferometer produces three detector output signals that depend on the phase difference between light that has travelled through different arms of the interferometer. Therefore, the phase difference can be computed from the detector output signals in a way so that it is possible to eliminate the effect of two other variables that affect the detector output signals, in particular the intensities of the interfering components.

However, it has been found that the combination of optical amplification before the interferometer and imperfections in the interferometer itself can cause dependence in the computed phase difference. This is avoided only for background light that is added before the optical amplification and/or and background light added after the amplifier that affect all detector output signals in the same way.

This can be seen as follows. Ideally, the detector output signals W(n) of the different detectors denoted by n=1, 2, 3 can be expressed as $$W(n)=A+B*\cos(phi+d(n))$$

Herein phi is the phase difference between light that has travelled through different arms of the interferometer that has to be computed from the detector output signals W(n), A and B are variables that have to be eliminated, which depend on the intensities of light that has travelled through different arms. d(n) are the phase offsets by which the light is combined by the 3-way combiner, which ideally are zero and plus and minus hundred twenty degrees.

The value of the phase difference, phi, that can be computed from these expressions is invariant under changes of A and B. The effect of the optical amplification can be expressed as a dependence of A and B on the optical amplification (A(G)=G*A(1)+G*O1+O2, B(G)=G*B(1), wherein G is the optical amplification gain and O1 and O2 are contributions due to incoherent background light added before and after the optical amplification). This means that the computed phase difference is invariant for optical amplification of the light because the effect of the optical amplification can be expressed entirely as a change of A and B.

Under less than ideal circumstances, A and B may depend also on the sensitivity and offset of the detection, i.e. the scale and offset may be different for different detector output signals W'(n):

$$W'(n)=A(n)+B(n)*\cos(phi+d(n))$$

Herein A(n) and B(n) depend on n, i.e. the detector output signal concerned. When the sensitivity and offset differences are known, the "n" dependence can be accounted for by applying a linear correction to W'(n) in order to obtain W(n), for example according to:

$$W(n)=F(n)*W'(n)-U(n)$$

This can be used to eliminate the n dependence of A and B when F(n)=B/B(n) and U(n)=F(n)*A(n)−A, with arbitrary variables A and B. The W(n) that is thus obtained from the detector output signals W'(n) satisfies the original expressions with A and B independent of n. NB. It should be noted that such a correction can be performed at any stage, e.g. before computing phi from W(n) or in an expression for computing phi directly from W'(n).

It may be noted that it is possible, but not certain, that the correction leaves the computed phi invariant to application of a common scaling factor to all detector output signals W'(n), such as due to optical amplification of the incoming signal of the interferometer. This depends on how the scaling factor affects the A(n). Invariance is only ensured if U(n) for all n can be determined independent of the amplification, except for an n-independent offset that may depend on the amplification.

In other words, the invariance is ensured only for background light that is added before the optical amplification and/or if the effect of background light added after the amplifier is the same for all detector output signals. The variable optical amplification may result in significant errors in the phase difference outcome if this is not the case.

However, the invariance of the computed phi value to application of a common scaling factor to all detector output signals can be ensured also if this is not the case, by using a correction based on a determination of an average detector output signals that can be obtained for a given optical amplification setting by varying the phase difference. Effectively, this is used to compensate for the differences between A(n) for different n at that optical amplification setting.

Figure 4:
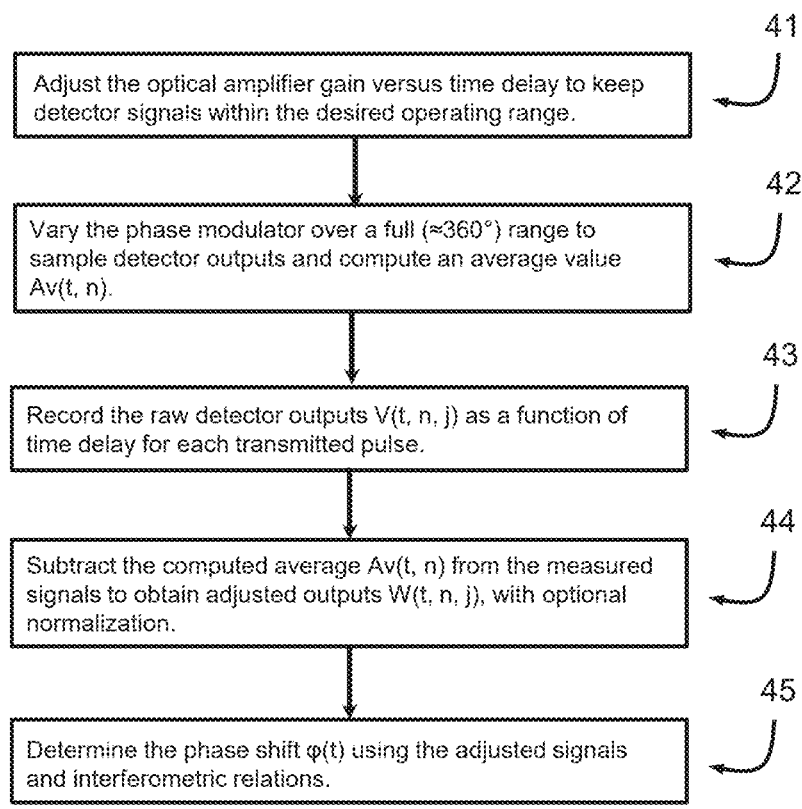
FIG. 4 shows a flow chart of DAS measurements

FIG. 4 shows a flow-chart of an embodiment of a DAS measurement process that uses such a correction. In a first step 41 processing system 29 selects a gain control signal for controlling the amplification of optical amplifier 14 as a function of time-delay from transmission of a pulse.

In an embodiment, the gain control signal may be set so as to increase the amplification for time delays where the backscatter intensity is small relative to the amplification for time delays where the backscatter intensity is large. Preferably the gain control signal is selected keep the detected signals of detectors 28a-b within an operating range of detectors 28a-b, e.g. so low that the detected signals are at all times below the maximum of an analog to digital conversion range of the analog to digital conversion that is used for the detected signals.

In a second step 42, processing system 29 causes phase modulator 24 to vary a phase shift imparted by phase modulator 24 to the light that is passed through first arm 22a. Processing system 29 is configured to determine values Av(t, n) for the output signal of detectors 28a-b indexed by n (n=1, 2, . . . ) at a delay time "t" after transmission of individual pulses when the selected gain control signal is applied. Av(t, n) defines an average over the range of the detector output signal values of the detector labeled by "n" over phase shifts that can be produced by phase modulator 24.

It should be noted that is not limited to actual averaging: values that define the average can be determined without actual averaging. For example, if use is made of the fact that the detector output signal varies in proportion to the cosine of the phase shift produced by phase modulator 24, measurements of the detector output signal n at time t at three different phase shifts applied by phase modulator 24 may suffice to define Av(t, n). Similarly, Av(t,n) may be fitted to detector output signals obtained at more different phase shifts.

In an embodiment processing system 29 may be configured to set the phase shift imparted by phase modulator 24 to a constant value during reception of backscatter of a pulse used in second step 42 and to change this phase shift before transmitting different pulses. Alternatively, this phase shift may be varied during reception of backscatter from a pulse used in second step 42.

In an embodiment, Av(t,n) may be determined by using Av(t,n)=(Max(t, n)+Min(t, n))/2 using maximum and minimum values Max(t, n) and Min(t, n) selected as the highest and lowest output signal values from detectors 28a-b at time delay t obtained in response to any of the pulses obtained with a range of phase shifts used in second step 42. This makes it unnecessary to known the actual phase shifts at which the output signal values from detectors 28a-b were obtained. Preferably, the phase shift phase modulator 24 is varied over at least a three hundred sixty-degree range in this embodiment of second step 42.

Preferably, in this embodiment, detector output signals are obtained for a plurality of closely spaced phase shifts imparted by phase modulator 24. If the highest and lowest output signal values from detectors 28a-b are used as maxima and minima, the spacing is preferably so that Max(t, n) and Min(t, n) do not substantially differ from the maximum and minimum for any phase shift (e.g. that they differ by less than one percent of the difference between Max(t, n) and Min(t, n)).

In another embodiment processing system 29 may be configured to interpolate or extrapolate Max(t, n) and Min(t, n) from the output signal of detectors 28a-b for different phase shifts by phase modulator 24. If interpolation or extrapolation is used to determine the maxima and minima, larger spacing between the imparted phase shifts and hence fewer pulses may be used.

In a third step 43, processing system 29 measures detector output signals V(t, n, j) from detectors 28a-b distinguished by the index n, as a function of delay "t" in response to an individual pulse indexed by "j". In a fourth step 44, processing system 29 computes adjusted detector output signals W(t, n, j).

The adjustment may for example be performed according to $$W(t,n,j)=V(t,n,j)-Av(t,n)$$

Herein W(t, n, j) denotes the adjusted output signal for detector 28a-b indexed by n, in response to an individual pulse indexed by j, as a function of time t after transmission of pulse j. Similarly, V(t, n, j) denotes the output signal of detector 28a-b before adjustment. Optionally W(t, n, j) may also be corrected for differences in the sensitivity of the detectors.

In a fifth step 45, processing system 29 computes a phase shift between the interfering components using the adjusted detector output signals. According to interferometer theory, the adjusted detector output signals W(t, n, j) substantially satisfy $$W(t,n,j)=B^*\cos(\text{phi}(t)-\text{theta}(n))$$

Herein B is a variable that can be eliminated in the computation of phi(t) if at least three detectors are used and theta (n) is the phase offset with which the light components have been combined before they are applied to the detector 28a-c indexed by n. Based on this processing system 29 computes phi(t).

W(t, n, j) may additionally be normalized using the maximum and minimum values $$W(t,n,j)=2^*(V(t,n,j)-Av(t,n))/(\text{Max}(t,n)-\text{Min}(t,n))$$

This may be used in the case that a correction for sensitivity difference is needed. In this case an N=2 way combiner may suffice to compute phi(t). E.g. if theta(1)=0 and theta(2)=90 degrees $$W(t,1,j)=\cos(\text{phi}(t)) \text{ and } W(t,2,j)=\sin(\text{phi}(t))$$

Hence phi(t) can be determined as the arctangent of W(t, 2, j)/W(t, 1, j) or a similar expression (for example an expression in terms of a function with W(t, 1, j) and W(t, 2, j) as arguments may be used that provides an accuracy if phi(t) that is independent of the value of phi(t)). If N>2, more than two W(t, n, j) are available, form which an estimate of phi(t) can be obtained, in a way that reduces the effect on noise. For each value of N this determination has the advantage that effects of the variation of the optical amplification are suppressed. Moreover, use of N>1 detectors has the advantage that the results will not be affected by intensity differences between the pulses, or common changes in the sensitivity of detectors 28a-c.

It should be noted that if transmission to the outputs of optical combiner 25 is sufficiently matched and the sensitivity detectors 28a-c and the transmission path to these detectors are sufficiently matched, Av(t, n) and Max(t, n) and Min(t, n) may be substantially independent of n. In this case, it would suffice to determine Max(t, n) and Min(t, n) for all n using the output signal of one detector only in second step 42. Third to fifth step 43-45 may be repeated for a plurality of pulses "j" that are transmitted at different time points, so as to compute phase shifts phi(t, j) as a function of time delay t from the different pulses j. The phase shift imparted by modulator 24 and the gain control signal may be the same for each of the measurements for the plurality of pulses "j". The same Av(t, n) (and optionally Max(t, n) and Min (t, n)) may be used for the adjustment of the adjusted detector output signals W(t, n, j) for each of the pulses j.

Similarly, second step 42 or first and second step 41, 42 may be repeated, so as to adjust to changed circumstances. The results of each such repetition may be used for a plurality of repetitions of third to fifth step 43-45, or for individual executions of third to fifth step 43-45. In an embodiment, third to fifth step 43-45 may be applied to detector output signals V(t, n, j) obtained during second step 42.

Variations of the process of FIG. 4 may be used. For example, if an N=3-way combiner is used, with theta(1)=0 and theta(2)=-theta(2)=120 degrees then phi(t) may be computed from $$tg(\text{phi})=\text{sqrt}(3)^*(W(t,3,j)-W(t,2,j))/(2^*W(t,1,j)-W(t,2,j)-W(t,3,j))$$

It may be noted that the phase shift phi for N=3 and higher does not change if a common factor and/or a common offset is applied to W(t, n, j) for all n. Thus use of N>2 detectors has the advantage that unequal Max and Min for different detectors 36a-c can be handled.

Although an embodiment has been described wherein fourth step 44 of adjusting the detector output signals and fifth step 45 of computing the phase shift are separate steps, it should be appreciated that the adjustment and computation may be integrated. In this case a formula may be used for the phase shift that depends on the detector output signals V(t,n,j) and Av(t, n).

Although an embodiment has been described wherein the gain control signal is selected in first step 41 and used for measurements in the other steps using a plurality of pulses, it should be noted that alternatively the gain control signal may be controlled by feedback based on measured time dependent backscatter intensity following each of the pulses. In this embodiment first step 41 may be omitted and the remaining steps may be performed using the feedback. Usually, there are no changes in the resulting gain control signal that have a substantial effect on the measured phase shift phi(t, j). Repeated execution of second step 42 may be sufficient used to prevent substantial effects on the measured phase shift, even if the changes in the resulting gain control signal are more substantial.

When optical amplifiers are used in both interferometer arms, these may both be controlled in the same way. But this is not necessary: it suffices that the amplification factor in first arm 22a varies in the same first way as a function of time from each pulse and the amplification factor in second arm 22b varies in the same second way as a function of time from each pulse. The computed phase shift may be made invariant for such variation of the amplification factors, if a correction determined with the amplification factors is used.

The invention claimed is:

1. A method of determining a phase shift between components of incoming light, using an interferometer system, wherein the interferometer system comprises:
   a first interferometer arm and a second interferometer arm, wherein an optical length of the second interferometer arm differs from an optical length of the first interferometer arm;

N optical detectors, where N is greater than one, and wherein each optical detector has an optical input;

an N-way optical coupler configured to supply combinations of light from the first interferometer arm and the second interferometer arm, with different relative phase offsets to each other, to the optical inputs of the N optical detectors, respectively;

a phase modulator coupled in series with the first interferometer arm;

wherein the method comprises:

optically amplifying the incoming light by an adjustable amplification factor;

obtaining, for each optical detector of the N optical detectors, measured detector output signals obtained with different phase shifts by the phase modulator in accordance with a value of the adjustable amplification factor, determining, for each optical detector of the N optical detectors, from the measured detector output signals, data that defines an average of output signals of the optical detector obtained with the different phase shifts; and computing a phase shift between light from the first interferometer arm and the second interferometer arm from detector output signals from the N optical detectors obtained with the value of the adjustable amplification factor, with a correction to compensate for differences between the average of output signals of the optical detectors.

2. The method according to claim 1, wherein the interferometer system comprises an optical amplifier between an input for the incoming light and both the first interferometer arm and the second interferometer arm, wherein the optical amplifying is performed by the optical amplifier.

3. The method according to claim 2, comprising transmitting a light pulse into an input end of an optical fiber and feeding backscatter of light from the light pulse from the input end to the first interferometer arm and the second interferometer arm via the optical amplifier, wherein:

the adjustable amplification factor by which the optical amplifier amplifies the incoming light is a function of time from the light pulse;

the determining comprises determining, for each optical detector of the N optical detectors, time dependent data defining the average for each optical detector of the N optical detectors as a function of time from the light pulse; and the computing the phase shift comprises computing a time dependent phase shift as a function of time from the light pulse, applying the correction as a function of time from the light pulse.

4. The method according to claim 1, wherein the data that defines, for each optical detector of the N optical detectors, the average, further defines a maximum detector output signal and a minimum detector output signal from a plurality of measured detector output signals, and wherein the method comprises obtaining the data that defines the average detector output signal at the value of the adjustable amplification factor from the defined maximum detector output signal and the minimum detector output signal.

5. The method according to claim 4, wherein the phase shift is computed with a further correction to equalize effects of signal scale differences of detector output signals from different optical detectors of the N optical detectors according to a difference between the defined maximum detector output signal and the minimum detector output signal for each optical detector of the N optical detectors.

6. The method according to claim 1, wherein N is at least three.

7. An optical interferometer system comprising:

a first interferometer arm and a second interferometer arm, wherein an optical length of the second interferometer arm differs from an optical length of the first interferometer arm;

N optical detectors, where N is greater than one, and wherein each optical detector has an optical input;

an N-way optical coupler, configured to supply combinations of light from the first interferometer arm and the second interferometer arm with different relative phase offsets to each other to the optical inputs of the N optical detectors, respectively; and a phase modulator coupled in series with the first interferometer arm between the optical fiber and the N-way optical coupler.

8. The optical interferometer system according to claim 7, further comprising a processing system having inputs coupled to outputs of the N optical detectors, and wherein the processing system is configured to perform operations of:

causing the phase modulator to apply different phase shifts;

obtaining, for each optical detector of the N optical detectors, measured detector output signals obtained with different phase shifts by the phase modulator in accordance with a value of the adjustable amplification factor, determining, for each of the N optical detectors, from the measured detector output signals, data that defines an average of output signals of the optical detector obtained with the different phase shifts; and computing a phase shift between light from the first interferometer arm and the second interferometer arm from detector output signals from the N optical detectors obtained with the value of the adjustable amplification factor, with a correction to compensate for differences between the average of output signals of the optical detectors.

9. The optical interferometer system according to claim 8, comprising an optical amplifier between an input for the incoming light and both the first interferometer arm and the second interferometer arm, wherein the optical amplifying is performed by the optical amplifier.

10. The optical interferometer system according to claim 9, comprising a pulsed light source, an optical fiber with an input end coupled to the pulsed light source, wherein the optical amplifier is located in an optical path from the input end to the first interferometer arm and the second interferometer arm, for optically amplifying backscatter from the optical fiber in response to light pulses from the pulsed light source, wherein the processing system is configured to cause the optical amplifier to apply a variation of the adjustable amplification factor by which the optical amplifier amplifies the backscatter as a function of time from the light pulses; and wherein:

the obtaining measured detector output signals operation comprises obtaining a plurality of measured detector output signals as a function of time from respective ones of the light pulses, after which different phase shifts are applied by the phase modulator in accordance with applying the variation, the determining comprises determining, from the measured detector output signals as a function of time, for each optical detector of the N optical detectors, time dependent data defining the average for each optical detector of the N optical detectors as a function of time from respective ones of the light pulses in accordance with application of the variation; and the computing the phase shift comprises computing a time dependent phase shift as a function of time from the light pulse, applying the correction as a function of time from at least one of the light pulses in accordance with application of the variation.

11. The optical interferometer system according to claim 8, wherein the data that defines, for each optical detector of the N optical detectors, the average, further defines, for each optical detector of the N optical detectors, a maximum detector output signal and a minimum detector output signal from a plurality of measured detector output signals obtained with different phase shifts by the phase modulator and at the value of the adjustable amplification factor, and wherein the processor is further configured to perform:
obtaining the data that defines the average detector output signal at the value of the adjustable amplification factor from the defined maximum detector output signal and the minimum detector output signal for the different time from the light pulse.

12. The optical interferometer system according to claim 11, wherein the processing system is configured to compute the phase shift with a further correction to equalize effects of signal scale differences of detector output signals from different optical detectors of the N optical detectors according to a difference between the defined maximum detector output signal and the minimum detector output signal for each optical detector of the N optical detectors.

13. The optical interferometer system according to claim 7, wherein N is at least three.

* * * * *